US011302115B2

(12) United States Patent
Wang et al.

(10) Patent No.: US 11,302,115 B2
(45) Date of Patent: Apr. 12, 2022

(54) METHOD FOR FACIAL INFORMATION PREVIEW AND RELATED PRODUCTS (71) Applicant: GUANGDONG OPPO MOBILE TELECOMMUNICATIONS CORP., LTD., Guangdong (CN)

(72) Inventors: Jian Wang, Guangdong (CN); Fangfang Hui, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 38 days.

(21) Appl. No.: 16/816,021

(22) Filed: Mar. 11, 2020

(65) Prior Publication Data
US 2020/0210686 A1 Jul. 2, 2020

Related U.S. Application Data (63) Continuation of application No. PCT/CN2018/099244, filed on Aug. 7, 2018.

(30) Foreign Application Priority Data

Sep. 12, 2017 (CN) .......................... 201710816637.1

(51) Int. Cl.
*G06K 9/00* (2022.01)
*G06F 21/32* (2013.01)
(Continued)

(52) U.S. Cl.
CPC ............ *G06V 40/172* (2022.01); *G06F 21/32* (2013.01); *G06V 10/443* (2022.01); *G06V 40/165* (2022.01)

(58) Field of Classification Search
CPC ........... G06K 9/00288; G06K 9/00248; G06K 9/4609; G06K 9/00221; G06K 9/00912;
(Continued)

(56) References Cited

U.S. PATENT DOCUMENTS

2012/0113261 A1* 5/2012 Satoh ...................... G06T 11/00
348/148
2013/0336545 A1* 12/2013 Pritikin .............. G06K 9/00892
382/116
(Continued)

FOREIGN PATENT DOCUMENTS

CN   103617385 A   3/2014
CN   104021331 A   9/2014
(Continued)

OTHER PUBLICATIONS

The extended European search Report issued in corresponding European U.S. Appl. No. 18855910.8 dated Jul. 14, 2020.
(Continued)

*Primary Examiner* — Edward F Urban
*Assistant Examiner* — Wassim Mahrouka
(74) *Attorney, Agent, or Firm* — Young Basile Hanlon & MacFarlane, P.C.

(57) ABSTRACT

A method for facial information preview and related products are provided. The method is applicable to a terminal device and includes the following. A camera of the terminal device is enabled and a switching notification is generated to notify a display screen of the terminal device to display at least one frame of transition interface before displaying a preview interface. The at least one frame of transition interface is displayed on the display screen according to the switching notification. Facial information is collected with the camera enabled and the preview interface is displayed on the display screen when the camera collects facial information.

10 Claims, 8 Drawing Sheets (51) Int. Cl.
*G06K 9/46* (2006.01)
*G06V 40/16* (2022.01)
*G06V 10/44* (2022.01)

(58) Field of Classification Search
CPC ... G06K 9/00228; G06F 21/32; G06F 9/4843; H04M 1/67
See application file for complete search history.

(56) References Cited

U.S. PATENT DOCUMENTS

| | | |
|---|---|---|
| 2014/0240544 A1 | 8/2014 | Kim et al. |
| 2015/0043790 A1* | 2/2015 | Ono ................ G06K 9/00255 382/118 |
| 2017/0003875 A1 | 1/2017 | Sheng |
| 2017/0070680 A1 | 3/2017 | Kobayashi |
| 2019/0080189 A1* | 3/2019 | Van Os ................ H04W 12/06 |

FOREIGN PATENT DOCUMENTS

| | | |
|---|---|---|
| CN | 104346603 A | 2/2015 |
| CN | 105760817 A | 7/2016 |
| CN | 106296888 A | 1/2017 |
| CN | 106384098 A | 2/2017 |
| CN | 106599664 A | 4/2017 |
| CN | 107608776 A | 1/2018 |
| CN | 107657160 A | 2/2018 |

OTHER PUBLICATIONS

English Translation of Office Action 1 issued in corresponding CN application No. 201710816637.1 dated Mar. 28, 2019.
English Translation of Office Action 2 issued in corresponding CN application No. 201710816637.1 dated Jun. 28, 2019.
English Translation of Office Action 3 issued in corresponding CN application No. 201710816637.1 dated Sep. 30, 2019.
International search report issued in corresponding international application No. PCT/CN2018/099244 dated Nov. 8, 2018.
Indian Examination Report for IN Application 202017012227 dated Aug. 3, 2021. (7 pages).

* cited by examiner

METHOD FOR FACIAL INFORMATION PREVIEW AND RELATED PRODUCTS

CROSS-REFERENCE TO RELATED APPLICATION(S)

This application is a continuation of International Patent Application No. PCT/CN2018/099244, filed on Aug. 7, 2018, which claims priority to Chinese Patent Application No. 201710816637.1, filed on Sep. 12, 2017, the disclosures of both of which are hereby incorporated by reference in their entireties.

TECHNICAL FIELD

This disclosure relates to the technical field of terminal devices, and more particularly to a method for facial information preview and related products.

BACKGROUND

Face unlock technology relates to authority management based on face recognition technology or face verification technology. A terminal system can use a biometric feature, such as a human face, as a password for authority protection. Face unlock is widely used in various aspects, such as unlocking of smartphones, unlocking of access control systems of banks and prisons, and so on. In face unlock technology, multiple face images of a user that has permission are collected, and after preprocessing and feature extraction of the multiple face images, a face feature database of the user is established. During unlocking, image information collected which has been subjected to face detection and feature extraction is compared with data in the face feature database pre-established to search for data similar to that of the image information collected. For example, if there is data with a similarity greater than a certain threshold (such as 0.9), it indicates that the face recognition succeeds, and therefore the user has permission to access; otherwise, the user is considered to have no permission and the unlocking fails.

SUMMARY

According to a first aspect, a terminal device is provided. The terminal device includes a processor, a camera, and a display screen. The camera is coupled with the processor and configured to collect facial information. The display screen is coupled with the processor and configured to display a preview interface, in which the facial information currently collected by the camera is presented. The processor is configured to generate a switching notification to notify the display screen to display at least one frame of transition interface before displaying the preview interface.

According to a second aspect, a method for facial information preview is provided. The method is applicable to a terminal device and includes the following. A camera of the terminal device is enabled and a switching notification is generated to notify a display screen of the terminal device to display at least one frame of transition interface before displaying a preview interface. The at least one frame of transition interface is displayed on the display screen according to the switching notification. Facial information is collected with the camera enabled and the preview interface is displayed on the display screen when the camera collects facial information.

According to a third aspect, a non-transitory computer-readable storage medium is provided. The non-transitory computer-readable storage medium is configured to store computer programs. The computer programs are operable with a computer to: enable a camera of a terminal device and generate a switching notification to notify a display screen of the terminal device to display at least one frame of transition interface before displaying a preview interface; display, on the display screen, the at least one frame of transition interface according to the switching notification; collect facial information with the camera enabled and display, on the display screen, the preview interface when the camera collects facial information.

BRIEF DESCRIPTION OF DRAWINGS

In order to describe technical solutions of implementations of the disclosure or the related art more clearly, the following will give a brief description of accompanying drawings used for describing the implementations of the disclosure or the related art. Apparently, the accompanying drawings described below illustrate merely some implementations of the disclosure. Those of ordinary skill in the art can also obtain other accompanying drawings based on the accompanying drawings described below without creative efforts.

DETAILED DESCRIPTION

In order to enable those skilled in the art to better understand solutions of the present disclosure, technical solutions embodied in implementations of the disclosure will be described in a clear and comprehensive manner in conjunction with the accompanying drawings. It is evident that the implementations described herein are merely some rather than all of the implementations of the disclosure. All other implementations obtained by those of ordinary skill in the art based on the implementations of the disclosure without creative efforts shall fall within the protection scope of the disclosure.

The terms "first", "second", and the like used in the specification, the claims, and the accompany drawings of the present disclosure are used to distinguish different objects rather than describe a particular order. The terms "include", "comprise", and "have" as well as variations thereof are intended to cover non-exclusive inclusion. For example, a process, method, system, product, or apparatus including a series of steps or units is not limited to the listed steps or units. Instead, it can optionally include other steps or units that are not listed. Other steps or units inherent to the process, method, product, or apparatus can also be included.

The term "implementation" referred to herein means that a particular feature, structure, or characteristic described in conjunction with the implementations may be contained in at least one implementation of the disclosure. The phrase appearing in various places in the specification does not necessarily refer to the same implementation, nor does it refer to an independent or alternative implementation that is mutually exclusive with other implementations. It is explicitly and implicitly understood by those skilled in the art that an implementation described herein may be combined with other implementations.

"Facial information" referred to herein refers to a face image of a user. The face image may be an image including only a user's face, or an image including other body parts of the user in addition to the user's face, which is not limited herein.

"Transition interface" referred to herein refers to an interface that may be displayed on a display device of the terminal device.

For better understanding of the method for facial information preview and related products described in implementations, the following will describe the technical solutions in detail.

The terminal device in implementations may include various handheld devices, in-vehicle devices, wearable devices, and computing devices having wireless communication functions or other processing devices connected to a wireless modem, as well as various forms of user equipment (UE), mobile stations (MS), and the like. For the convenience of description, the above-mentioned devices are collectively referred to as a terminal device.

The terminal device described in implementations is equipped with a facial information collecting device, which may be a general-purpose camera module, such as a front camera. The following will describe the implementations in detail with reference to the accompanying drawings.

Figure 1:
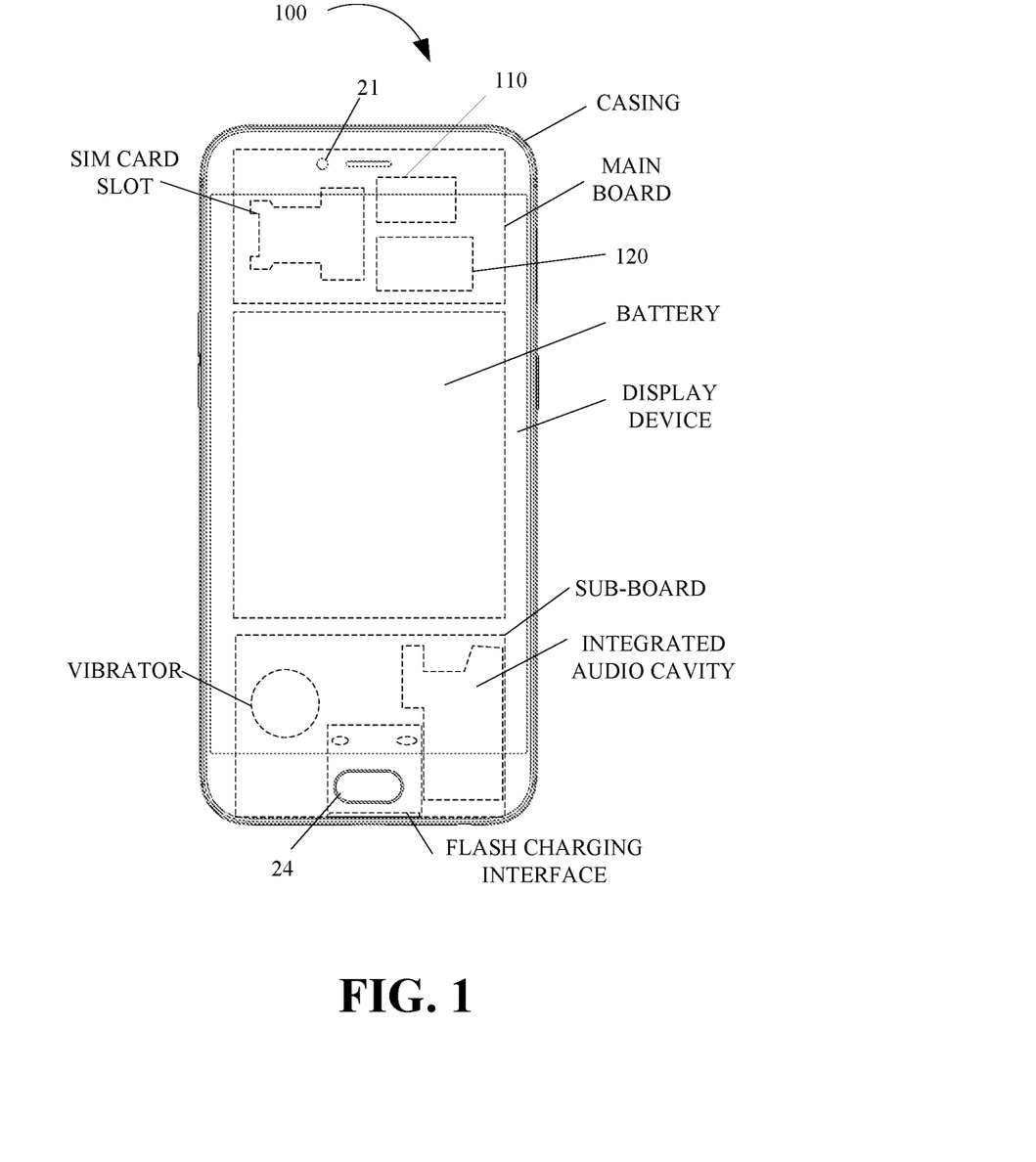
FIG. 1 is a schematic structural view of a terminal device according to at least one implementation.

FIG. 1 is a schematic structural view of a terminal device 100 according to at least one implementation. The terminal device 100 includes a casing, a display device, a main board, a battery, and a sub-board. The main board is provided with a front camera 21, a processor 110, and a memory 120, and defines a subscriber identity module (SIM) card slot. The sub-board is provided with a vibrator, an integrated audio cavity, and a VOOC flash charging interface. The front camera 21 is used as a facial information collecting device of the terminal device 100.

In one example, the display device may be a display screen of the terminal device.

In at least one implementation, the facial information collecting device is configured to collect facial information. The display screen is configured to display a preview interface, in which the facial information currently collected by the facial information collecting device is presented. The processor 110 is coupled with the facial information collecting device and the display screen and configured to generate a switching notification to notify the display screen to display at least one frame of transition interface before displaying the preview interface.

In one example, the front camera 21 is configured to collect a face image of a user. After the face image is obtained by the front camera 21, the processor 110 is configured to pre-process the face image to extract facial feature points from the face image. Alternatively, the terminal device may send the face image to a server, such that the server can pre-process the face image to extract the facial feature points from the face image.

In at least one implementation, the at least one frame of transition interface is displayed to replace at least one frame of black-screen interface which is displayed before displaying the preview interface. That is, in the implementation, the at least one frame of transition interface may be displayed after the terminal device enables the facial information collecting device and prior to display of the preview interface.

In one example, the at least one frame of black-screen interface is caused by black screen which occurs to a display interface of the display screen before the facial information collecting device has been successfully enabled.

In at least one implementation, the display screen is configured to filter out (eliminate), according to the switching notification, at least one frame of black-screen interface which is displayed before displaying the preview interface. The processor 110 is configured to invoke a facial enrolling application to display at least one frame of transition interface corresponding to the at least one frame of black-screen interface filtered out.

In one example, the processor 110 is configured to invoke, via a facial information collecting service, a facial enrolling application to display at least one frame of transition interface corresponding to the at least one frame of black-screen interface filtered out.

In at least one implementation, the at least one frame of transition interface is embodied as a multi frame transition interface, and the processor 110 is further configured to control the display screen to switch from the multi frame transition interface to the preview interface, upon detecting that for the multi frame transition interface, the number of frames that have been played is greater than or equal to a preset number.

In at least one implementation, the at least one frame of transition interface is embodied as a single frame transition interface, and the processor 110 is further configured to control the display screen to switch from the single frame transition interface to the preview interface, upon detecting that the single frame transition interface has been played for a duration longer than or equal to a preset duration.

In at least one implementation, the at least one frame of transition interface is embodied as a multi frame transition interface, and the processor 110 is further configured to update the multi frame transition interface according to the facial information collected by the facial information collecting device.

In at least one implementation, the processor 110 is further configured to operate as follows. The processor 110 is further configured to acquire the facial information collected by the facial information collecting device. The processor 110 is further configured to determine whether the facial information collected matches the facial information template. The processor 110 is further configured to unlock the terminal device based on a determination that the facial information collected matches the facial information template.

In at least one implementation, the processor 110 is further configured to receive an instruction, where the facial information collecting device is configured to be enabled and the processor is configured to generate the switching notification, in response to the instruction.

In one example, in terms of receiving the instruction, the processor 110 is configured to receive a request for enrolling a facial information template or receive an unlock request for a target event.

In the terminal device, the terminal device enables the facial information collecting device and generates the switching notification to notify the display screen of the terminal device to display the at least one frame of transition interface before displaying the preview interface. The terminal device displays, on the display screen, the at least one frame of transition interface according to the switching notification. The terminal device collects facial information with the facial information collecting device enabled and displaying, on the display screen, the preview interface when the facial information collecting device collects facial information. As can be seen, according to the above method, it is possible to avoid black screen which occurs to the preview interface due to the fact that a time point at which the preview interface is completely loaded is earlier than a time point at which the facial information collecting device is successfully enabled, such that accuracy and stability of image display of the preview interface can be improved, thereby improving user experience.

Figure 2:
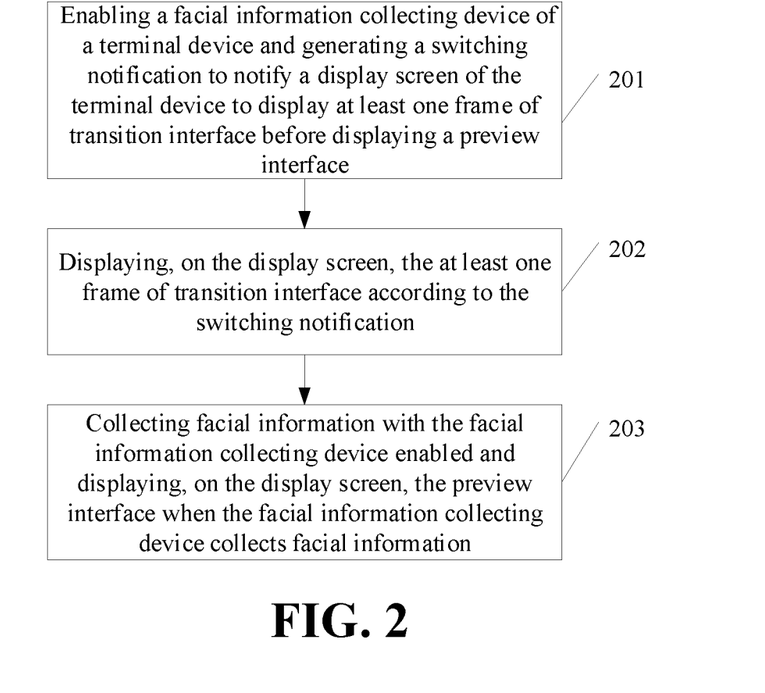
FIG. 2 is a schematic flowchart of a method for facial information preview according to implementations.

FIG. 2 is a schematic flowchart of a method for facial information preview according to implementations. The method is applicable to a terminal device. As illustrated in FIG. 2, the method begins at block 201.

At block 201, a facial information collecting device of the terminal device is enabled and a switching notification is generated to notify a display screen of the terminal device to display at least one frame of transition interface before displaying a preview interface.

In one example, the facial information collecting device is a camera.

In at least one implementation, prior to enabling the facial information collecting device and generating the switching notification, the following can be conducted. An instruction is received.

In at least one implementation, the terminal device enables the facial information collecting device and generates the switching notification to notify the display screen of the terminal device to display the at least one frame of transition interface before displaying the preview interface, when a request for enrolling a facial information template or an unlock request for a target event is received. Since a time point at which loading of the preview interface is completed is earlier than a time point at which the facial information collecting device is successfully enabled, a black screen of the preview interface (also known as black-screen interface) may occur due to time difference between the two time points. To avoid the black-screen interface, the terminal device displays the at least one frame of transition interface before displaying the preview interface.

At block 202, the at least one frame of transition interface is displayed on the display screen according to the switching notification.

In at least one implementation, the at least one frame of transition interface is displayed to replace at least one frame of black-screen interface which is displayed before displaying the preview interface. In one example, the at least one frame of transition interface may be a dynamic picture of multiple frames or may be a static picture of one frame, which is not limited herein.

At block 203, facial information is collected with the facial information collecting device enabled and the preview interface is displayed on the display screen when the facial information collecting device collects facial information.

Figure 2A:
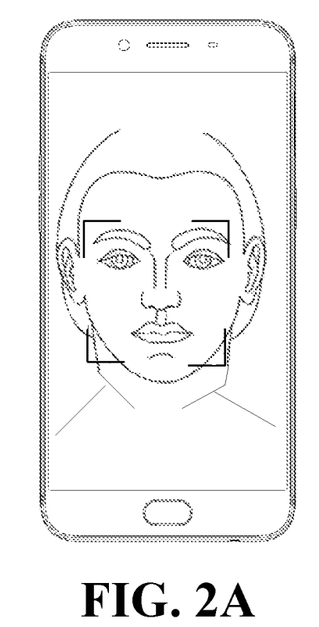
FIG. 2A is a schematic view of a preview interface according to implementations.

In one example, a schematic view of the preview interface is illustrated in FIG. 2A. The preview interface is used for display of image information collected by the facial information collecting device, and according to the image information, a shooting angle (that is, an angle at which a picture is taken) can be adjusted.

In the method for facial information preview, the facial information collecting device of the terminal device is enabled and the switching notification is generated to notify the display screen of the terminal device to display at least one frame of transition interface before displaying the preview interface. The at least one frame of transition interface is displayed on the display screen according to the switching notification. Facial information is collected with the facial information collecting device enabled and the preview interface is displayed on the display screen when the facial information collecting device collects facial information. As can be seen, by performing the above method, it is possible to avoid black screen which occurs to the preview interface due to the fact that a time point at which the preview interface is completely loaded is earlier than a time point at which the enabling of the facial information collecting device is completed. As such, accuracy and stability of image display of the preview interface can be improved, and therefore user experience can be improved.

In at least one implementation, the at least one frame of transition interface is displayed on the display screen according to the switching notification as follows. At least one frame of black-screen interface which is displayed before displaying the preview interface is filtered out (eliminated). A facial enrolling application is invoked (for example, the facial enrolling application is invoked via a facial information collecting service) to display at least one frame of transition interface corresponding to the at least one frame of black-screen interface filtered out.

In at least one implementation, the at least one frame of transition interface is embodied as a multi frame transition interface, and prior to collecting the facial information and displaying, on the display screen, the preview interface, the following can be conducted. Upon detecting that for the multi frame transition interface, the number of frames that have been played is greater than or equal to a preset number, switch from the multi frame transition interface to the preview interface.

In one example, since the time point at which loading of the preview interface is completed is earlier than the time point at which the facial information collecting device is successfully enabled, if the loading of the preview interface and the enabling of the facial information collecting device are simultaneously conducted, black screen occurs to the first few frames (generally the first three frames) displayed on the preview interface. According to implementations, black screen of the preview interface (that is, at least one frame of black-screen interface) can be overcome with at least one frame of transition interface, and for the multi frame transition interface, when the number of frames that have been played is greater than or equal to the preset number, switch from the multi frame transition interface to the preview interface.

In at least one implementation, the at least one frame of transition interface is embodied as a single frame transition interface, and prior to collecting the facial information and displaying, on the display screen, the preview interface, the following can be conducted. When the single frame transition interface has been played for a duration longer than or equal to a preset duration, switch from the single frame transition interface to the preview interface.

In at least one implementation, the at least one frame of transition interface is embodied as a multi frame transition interface, and the following can be conducted. The multi frame transition interface is updated according to the facial information collected by the facial information collecting device.

Figure 2B:
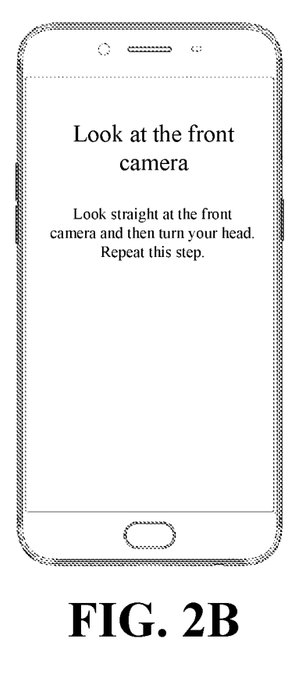
FIG. 2B is a schematic view of a preview interface according to other implementations.
Figure 2C:
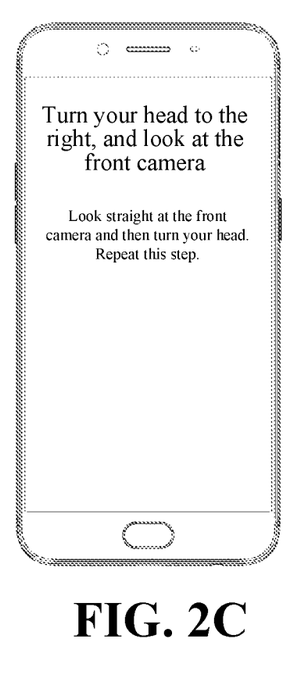
FIG. 2C is a schematic view of a preview interface according to other implementations.
Figure 2D:
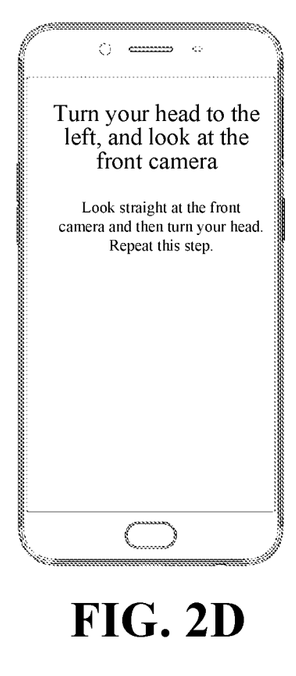
FIG. 2D is a schematic view of a preview interface according to other implementations.

In one example, the transition interface can be updated in real time according to the image information collected by the facial information collecting device. For example, when the terminal device detects, with the facial information collecting device, that the user is not looking straight at the front camera, a transition interface of current frame may be switched to a transition interface of next frame, on which information for prompting the user to rotate his/her head to look straight at the front camera will be displayed. The schematic view of the transition interface of the next frame is illustrated in FIG. 2B. As an example, when the terminal device detects, with the facial information collecting device, that the face of the user is tilted to the left relative to the front camera, the schematic view of the transition interface of next frame is illustrated in FIG. 2C. As another example, when the terminal device detects, with the facial information collecting device, that the face of the user is tilted to the right relative to the front camera, the schematic view of the transition interface of next frame is illustrated in FIG. 2D.

In at least one implementation, the method further includes the following. The facial information collected by the facial information collecting device is acquired. Determine whether the facial information collected matches a facial information template. Unlock the terminal device based on a determination that the facial information collected matches the facial information template.

The facial information collecting device collects at least one face image of the user. After acquiring the at least one face image, the terminal device may preprocess the at least one face image and extract facial feature points from the at least one face image to obtain the facial information template. When the unlock request for a target event is detected, the terminal device compares the collected facial information of the user with the above-mentioned facial information template. When the collected facial information of the user matches the above-mentioned facial information template, the terminal device performs unlocking, so as to improve security of the terminal device.

In at least one implementation, the instruction is received as follows. A request for enrolling a facial information template is received. Alternatively, an unlock request for a target event is received.

In one example, the collected facial information is compared with the facial information template, and accordingly, unlocking is performed.

In one example, the unlock request for a target event may be, for example, an unlock request for a desktop, an unlock request for an application, an unlock request for a file, or an authentication request for logging onto a payment application or paying with a payment application, which is not limited herein. The unlock request for a desktop refers to an unlock request for a lock-screen desktop. The unlock request for an application refers to an unlock request for a certain operation on the application, such as launching the application, uninstalling the application, and so on. The unlock request for a file refers to a request for unlocking the file, such as a request for unlocking a target file. The authentication request for a payment application refers to an authentication request when paying with an application such as a payment application or a mobile bank application, such as an authentication request when making a payment with the payment application or an authentication request when making a transfer with the mobile bank application.

Figure 3:
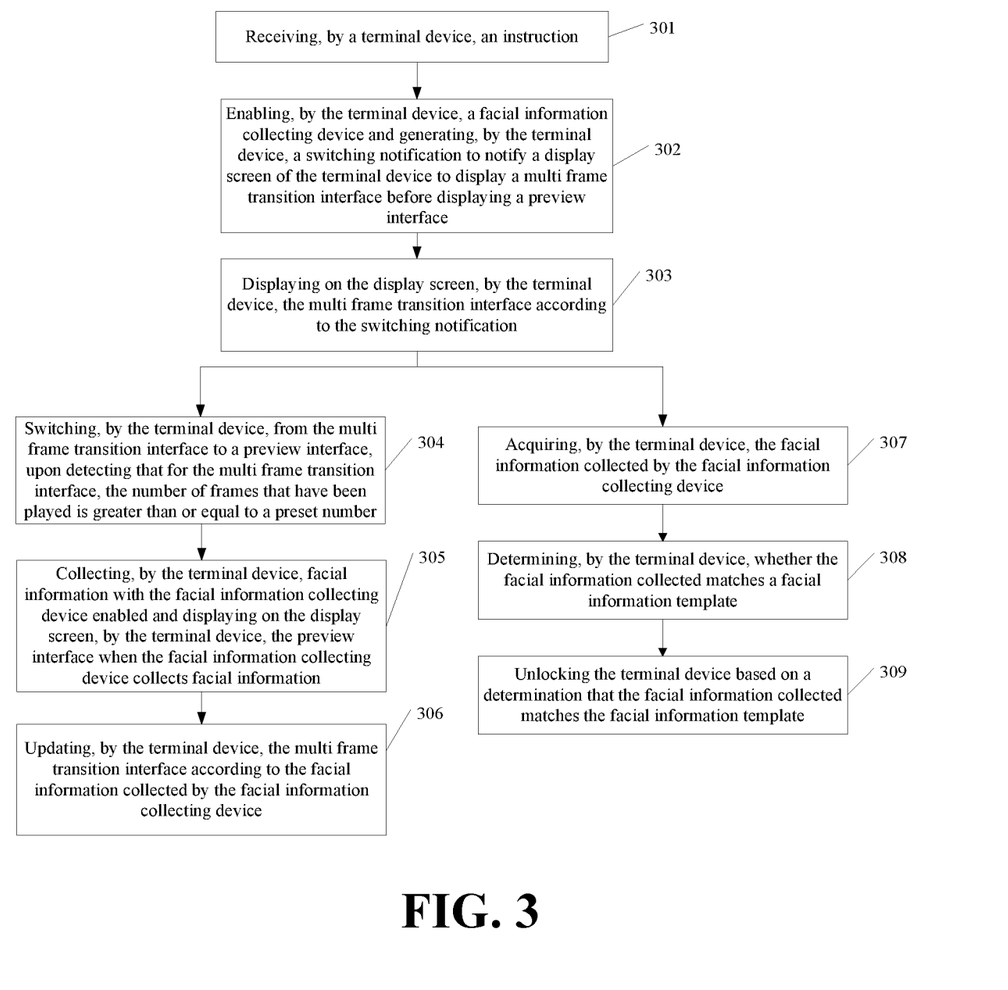
FIG. 3 is a schematic flowchart of a method for facial information preview according to other implementations.

FIG. 3 is a schematic flowchart of a method for facial information preview according to other implementations. Compared with implementations illustrated in FIG. 2, implementations illustrated in FIG. 3 describe in further detail a time point for switching from a multi frame transition interface to a preview interface when the at least one frame of transition interface is a multi frame transition interface. As illustrated in FIG. 3, the method begins at block 301.

At block 301, the terminal device receives an instruction.

In one example, the terminal device receives the instruction as follows. The terminal device receives a request for enrolling a facial information template. Alternatively, the terminal device receives an unlock request for a target event.

At block 302, the terminal device enables the facial information collecting device and generates a switching notification to notify a display screen of the terminal device to display a multi frame transition interface before displaying a preview interface.

At block 303, the terminal device displays, on the display screen, the multi frame transition interface according to the switching notification.

At block 304, upon detecting that for the multi frame transition interface, the number of frames that have been played is greater than or equal to a preset number, the terminal device switches from the multi frame transition interface to a preview interface.

At block 305, the terminal device collects facial information with the facial information collecting device enabled and displays, on the display screen, the preview interface when the facial information collecting device collects facial information.

At block 306, the terminal device updates the multi frame transition interface according to the facial information collected by the facial information collecting device.

At block 307, the terminal device acquires the facial information collected by the facial information collecting device.

At block 308, the terminal device determines whether the facial information collected matches the facial information template.

At block 309, unlock the terminal device based on a determination that the facial information collected matches the facial information template.

In the method for facial information preview, the terminal device enables the facial information collecting device and generates a switching notification to notify the display screen of the terminal device to display the multi frame transition interface before displaying the preview interface. The terminal device displays, on the display screen, the multi frame transition interface according to the switching notification. The terminal device collects the facial information with the facial information collecting device enabled and displays, on the display screen, the preview interface when the facial information collecting device collects facial information. As can be seen, by performing the above method, it is possible to avoid black screen which occurs to the preview interface due to the fact that a time point at which the preview interface is completely loaded is earlier than a time point at which the facial information collecting device is successfully enabled, such that accuracy and stability of image display of the preview interface can be improved, thereby improving user experience.

Figure 4:
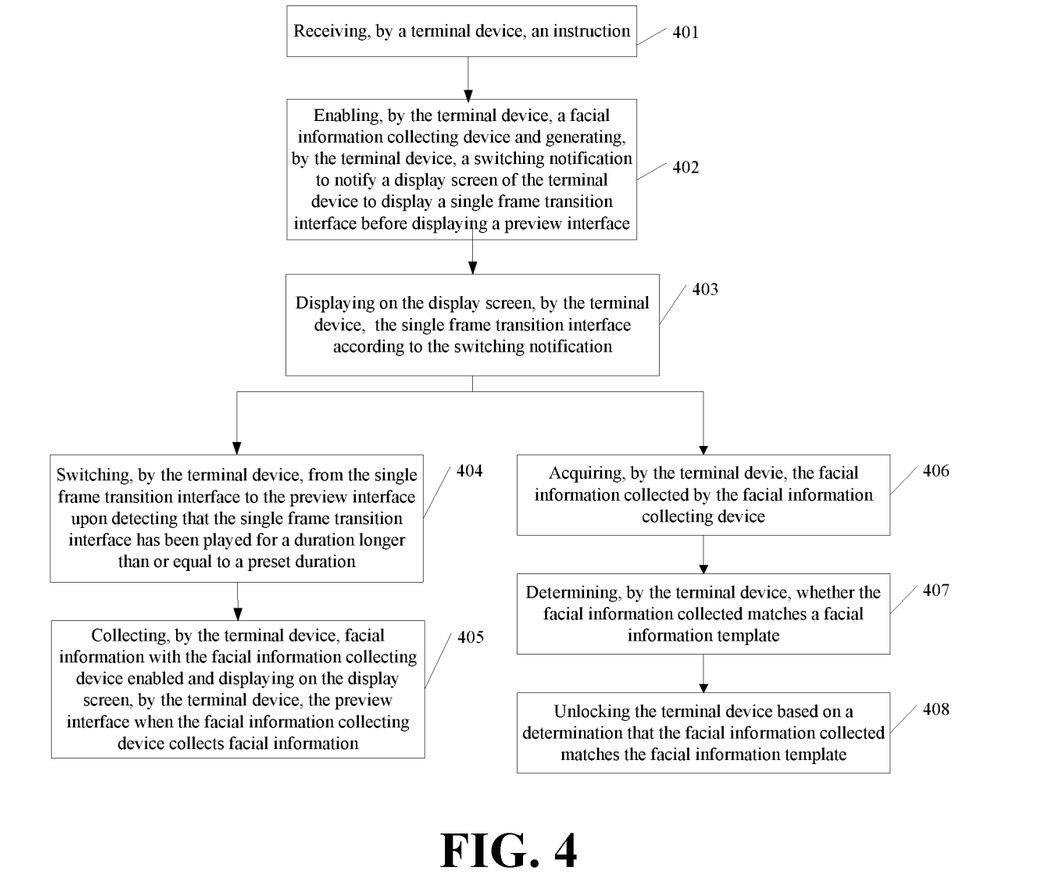
FIG. 4 is a schematic flowchart of a method for facial information preview according to other implementations.

FIG. 4 is a schematic flowchart of a method for facial information preview according to other implementations. The method illustrated in FIG. 4 differs from FIG. 3 in that the at least one frame of transition interface is a single frame transition interface. As illustrated in FIG. 4, the method begins at block 401.

At block 401, the terminal device receives an instruction.

In one example, the terminal device receives the instruction as follows. The terminal device receives a request for enrolling a facial information template. Alternatively, the terminal device receives an unlock request for a target event.

At block 402, the terminal device enables the facial information collecting device and generates a switching notification to notify a display screen of the terminal device to display a single frame transition interface before displaying a preview interface.

At block 403, the terminal device displays, on the display screen, the single frame transition interface according to the switching notification.

At block 404, upon detecting that the single frame transition interface has been played for a duration longer than or equal to a preset duration, the terminal device switches from the single frame transition interface to the preview interface.

At block 405, the terminal device collects facial information with the facial information collecting device enabled and displays, on the display screen, the preview interface when the facial information collecting device collects facial information.

At block 406, the terminal device acquires the facial information collected by the facial information collecting device.

At block 407, the terminal device determines whether the facial information collected matches the facial information template.

At block 408, unlock the terminal device based on a determination that the facial information collected matches the facial information template.

In the method for facial information preview, the terminal device enables the facial information collecting device and generates the switching notification to notify the display screen of the terminal device to display the single frame transition interface before displaying the preview interface. The terminal device displays, on the display screen, the single frame transition interface according to the switching notification. The terminal device collects the facial information with the facial information collecting device enabled and displays, on the display screen, the preview interface when the facial information collecting device collects facial information. As can be seen, by performing the above method, it is possible to avoid black screen which occurs to the preview interface due to the fact that a time point at which the preview interface is completely loaded is earlier than a time point at which the facial information collecting device is successfully enabled, such that accuracy and stability of image display of the preview interface can be improved, thereby improving user experience.

Figure 5:
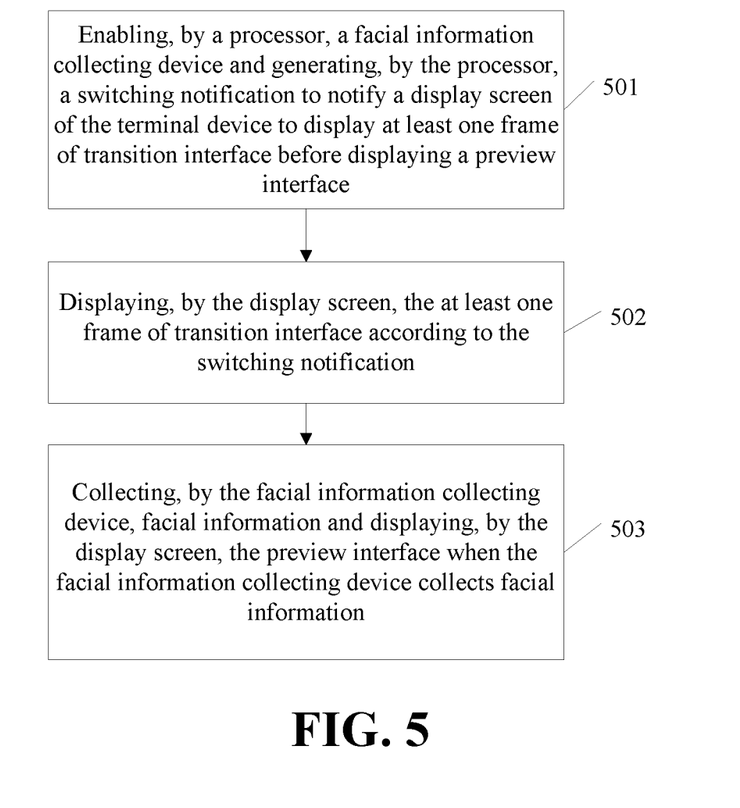
FIG. 5 is a schematic flowchart of a method for facial information preview according to other implementations.

FIG. 5 is a schematic flow chart of a method for facial information preview according to other implementations. The method is applicable to a terminal device that includes a facial information collecting device, a display screen, a memory, a communication module, and a processor. At illustrated in FIG. 5, the method begins at block 501.

At block 501, the processor enables the facial information collecting device and generates a switching notification to notify a display screen of the terminal device to display at least one frame of transition interface before displaying a preview interface.

At block 502, the display screen displays the at least one frame of transition interface according to the switching notification.

At block 503, the facial information collecting device collects facial information and the display screen displays the preview interface when the facial information collecting device collects facial information.

In at least one implementation, the at least one frame of transition interface is displayed to replace at least one frame of black-screen interface which is displayed before displaying the preview interface.

In at least one implementation, the display screen displays the at least one frame of transition interface according to the switching notification as follows. The display screen filters out, according to the switching notification, at least one frame of black-screen interface which is displayed before displaying the preview interface. The processor invokes a facial enrolling application to display at least one frame of transition interface corresponding to the at least one frame of black-screen interface filtered out.

In at least one implementation, the at least one frame of transition interface is embodied as a multi frame transition interface. Before the facial information collecting device collects facial information and the display screen displays the preview interface, the processor controls the display screen to switch from the multi frame transition interface to the preview interface, upon detecting that for the multi frame transition interface, the number of frames that have been played is greater than or equal to a preset number.

In at least one implementation, the at least one frame of transition interface is embodied as a single frame transition interface. Before the facial information collecting device collects facial information and the display screen displays the preview interface, the processor controls the display screen to switch from the single frame transition interface to the preview interface, upon detecting that the single frame transition interface has been played for a duration longer than or equal to a preset duration.

In at least one implementation, the at least one frame of transition interface is embodied as a multi frame transition interface, and the method further includes the following. The processor updates the multi frame transition interface according to the facial information collected by the facial information collecting device.

In at least one implementation, the method further includes the following. The processor acquires the facial information collected by the facial information collecting device, determines whether the facial information collected matches the facial information template, and unlocks the terminal device based on a determination that the facial information collected matches the facial information template.

In at least one implementation, the method further includes the following before the processor enables the facial information collecting device and generates the switching notification. The processor receives an instruction.

In one example, the processor receives the instruction as follows. The processor receives a request for enrolling a facial information template, or the processor receives an unlock request for a target event.

In the method for facial information preview, the processor enables the facial information collecting device and generates the switching notification to notify the display screen of the terminal device to display the at least one frame of transition interface before displaying the preview interface. The display screen displays the at least one frame of transition interface according to the switching notification. The facial information collecting device collects facial information and the display screen displays the preview interface when the facial information collecting device collects facial information. As can be seen, by performing the above method, it is possible to avoid black screen which occurs to the preview interface due to the fact that a time point at which the preview interface is completely loaded is earlier than a time point at which the facial information collecting device is successfully enabled, such that accuracy and stability of image display of the preview interface can be improved, thereby improving user experience.

Figure 6A:
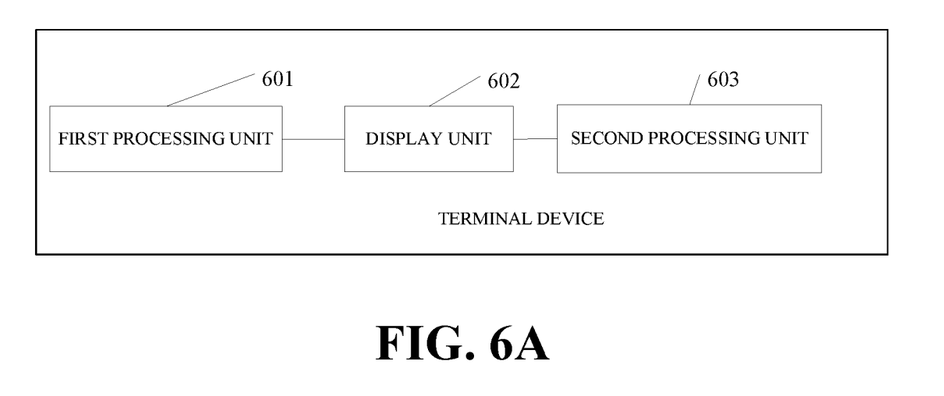
FIG. 6A is a schematic structural diagram illustrating components of a terminal device according to implementations.

The following will describe device implementations. The device in device implementations is configured to perform operations described in the method implementations. FIG. 6A is a schematic structural diagram illustrating components of a terminal device according to implementations. As illustrated in FIG. 6A, the terminal device includes a first processing unit 601, a display unit 602, and a second processing unit 603. The first processing unit 601 is configured to enable a facial information collecting device and generates a switching notification to notify a display screen of the terminal device to display at least one frame of transition interface before displaying a preview interface. The display unit 602 is configured to display, on a display screen of the terminal device, at least one frame of transition interface according to the switching notification. The second processing unit 603 is configured to collect facial information with the facial information collecting device enabled and display, on the display screen, the preview interface when the facial information collecting device collects facial information.

Figure 6B:
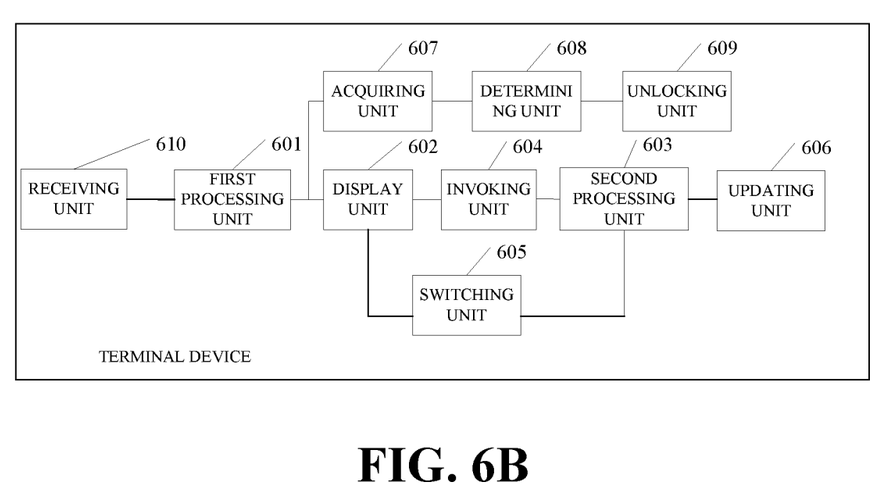
FIG. 6B is a schematic structural diagram illustrating components of a terminal device according to other implementations.

FIG. 6B is a schematic structural diagram illustrating components of a terminal device according to other implementations. As illustrated in FIG. 6B, the terminal device includes the first processing unit 601, the display unit 602, and the second processing unit 603 that are correspondingly illustrated in FIG. 6A.

In one example, the terminal device further includes an invoking unit 604. In terms of displaying, on the display screen, the at least one frame of transition interface according to the switching notification, the display unit 602 is configured to eliminate at least one frame of black-screen interface which is displayed before displaying the preview interface. The invoking unit 604 is configured to invoke a facial enrolling application to display at least one frame of transition interface corresponding to the at least one frame of black-screen interface eliminated.

In one example, the terminal device further includes a switching unit 605. The at least one frame of transition interface is embodied as a multi frame transition interface, and the switching unit 605 is configured to switch from the multi frame transition interface to the preview interface, upon detecting that for the multi frame transition interface, the number of frames that have been played is greater than or equal to a preset number before the second processing unit 603 collects the facial information and displays the preview interface.

In one example, the at least one frame of transition interface is embodied as a single frame transition interface, and the switching unit 605 is further configured to switch from the single frame transition interface to the preview interface, upon detecting that the single frame transition interface has been played for a duration longer than or equal to a preset duration before the second processing unit 603 collects the facial information and displays the preview interface.

In one example, the terminal device further includes an updating unit 606. The at least one frame of transition interface is embodied as a multi frame transition interface, and the updating unit 606 is configured to update the multi frame transition interface according to the facial information collected by the facial information collecting device.

In one example, the terminal device further includes an acquiring unit 607, a determining unit 608, and an unlocking unit 609. The acquiring unit 607 is configured to acquire the facial information collected by the facial information collecting device. The determining unit 608 is configured to determine whether the facial information collected matches the facial information template. The unlocking unit 609 is configured to unlock the terminal device based on a determination that the facial information collected matches the facial information template.

In one example, the terminal device further includes a receiving unit 610. The receiving unit 610 is configured to receive an instruction before the first processing unit 601 enables the facial information collecting device and generates the switching notification.

In one example, in terms of receiving the instruction, the receiving unit 610 is configured to receive a request for enrolling a facial information template, or receive an unlock request for a target event.

For implementations of the foregoing units, reference may be made to related descriptions in the foregoing implementations corresponding to FIG. 2 to FIG. 4, and details are not described herein again.

It should be noted that the terminal device described in the device implementations is presented in the form of functional units. The term "unit" used herein should be understood as the widest possible meaning. The object used to implement the functions described by each "unit" may be at least one of: an integrated circuit (such as an application specific integrated circuit (ASIC)), a single circuit, a processor (such as a shared processor, a specific processor, or chipset) used to perform one or more software or firmware programs and a memory, combined logic circuits, or other suitable components that provide the functions described above.

Figure 7:
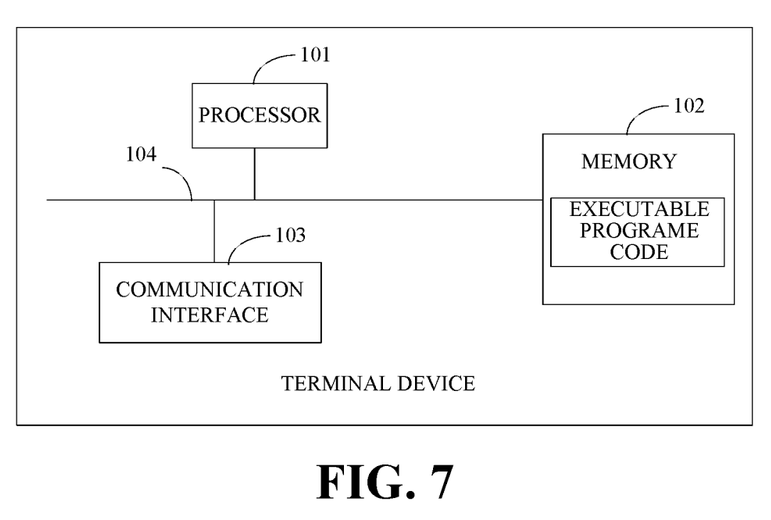
FIG. 7 is a schematic structural diagram of a terminal device according to implementations.

For example, when the receiving unit 610 receives the instruction, the enabling of the facial information collecting device may be achieved by the terminal device illustrated in FIG. 7. In particular, a processor 101 is configured to invoke executable program codes stored in a memory 102 to enable the facial information collecting device, upon reception of the instruction by the receiving unit 610.

In the terminal device in the foregoing implementations, the terminal device enables the facial information collecting device of the terminal device and generates the switching notification to notify the display screen of the terminal device to display at least one frame of transition interface before displaying a preview interface. The terminal device displays, on the display screen, the at least one frame of transition interface according to the switching notification. The terminal device collects the facial information with the facial information collecting device enabled and displays, on the display screen, the preview interface when the facial information collecting device collects facial information. As can be seen, by performing the above method, it is possible to avoid black screen which occurs to the preview interface due to the fact that a time point at which the preview interface is completely loaded is earlier than a time point at which the facial information collecting device is successfully enabled, such that accuracy and stability of image display of the preview interface can be improved, thereby improving user experience.

As illustrated in FIG. 7, a terminal device is provided. The terminal device includes the processor 101, the memory 102, a communication interface 103, and a communication bus 104. The processor 101, the memory 102, and the communication interface 103 are coupled with each other via the communication bus 104 for communication which each other. The processor 101 is configured to control wireless communication with an external cellular network via the communication interface 103. The communication interface 103 includes, but is not limited to, an antenna, an amplifier, a transceiver, a coupler, a low noise amplifier (LNA), a duplexer, and the like. The memory 102 includes at least one of the following: a random access memory (RAM), a non-transitory memory, and an external memory. The memory 102 is configured to store executable program codes which, when executed by the processor 101, cause the processor 101 to: enable a facial information collecting device of the terminal device and generate a switching notification to notify a display screen of the terminal device to display at least one frame of transition interface before displaying a preview interface; display, on the display screen, the at least one frame of transition interface according to the switching notification; collect facial information with the facial information collecting device enabled and display, on the display screen, the preview interface when the facial information collecting device collects facial information.

In one example, in terms of receiving the instruction for requesting the facial information collecting device to collect facial information, the processor 101 is configured to receive a request for enrolling a facial information template or receive an unlock request for a target event.

In one example, the at least one frame of transition interface is embodied as a multi frame transition interface, and the executable program codes, when executed by the processor 101, further cause the processor 101 to switch from the multi frame transition interface to the preview interface, upon detecting that for the multi frame transition interface, the number of frames that have been played is greater than or equal to a preset number.

In one example, the at least one frame of transition interface is embodied as a single frame transition interface, and the executable program codes, when executed by the processor 101, further cause the processor 101 to switch from the single frame transition interface to the preview interface, upon detecting that the single frame transition interface has been played for a duration longer than or equal to a preset duration.

In one example, the at least one frame of transition interface is embodied as a multi frame transition interface, and the executable program codes, when executed by the processor 101, further cause the processor 101 to update the multi frame transition interface according to the facial information collected by the facial information collecting device.

In one example, the executable program codes, when executed by the processor 101, further cause the processor 101 to acquire the facial information collected by the facial information collecting device; determine whether the facial information collected matches the facial information template unlock the terminal device based on a determination that the facial information collected matches the facial information template.

In one example, the executable program codes, when executed by the processor 101, further cause the processor 101 to receive an instruction before enabling the facial information collecting device and generating the switching notification.

In one example, the executable program codes, when executed by the processor 101, further cause the processor 101 to receive a request for enrolling a facial information template or receive an unlock request for a target event.

For implementations of the foregoing units, reference may be made to related descriptions in the foregoing implementations corresponding to FIG. 2 to FIG. 4, which is not described herein again.

In the terminal device of the foregoing implementations, the terminal device enables the facial information collecting device of the terminal device and generates the switching notification to notify the display screen of the terminal device to display at least one frame of transition interface before displaying a preview interface. The terminal device displays, on the display screen, the at least one frame of transition interface according to the switching notification. The terminal device collects the facial information with the facial information collecting device enabled and displays, on the display screen, the preview interface when the facial information collecting device collects facial information. As can be seen, by performing the above method, it is possible to avoid black screen which occurs to the preview interface due to the fact that a time point at which the preview interface is completely loaded is earlier than a time point at which the facial information collecting device is successfully enabled, such that accuracy and stability of image display of the preview interface can be improved, thereby improving user experience.

Figure 8:
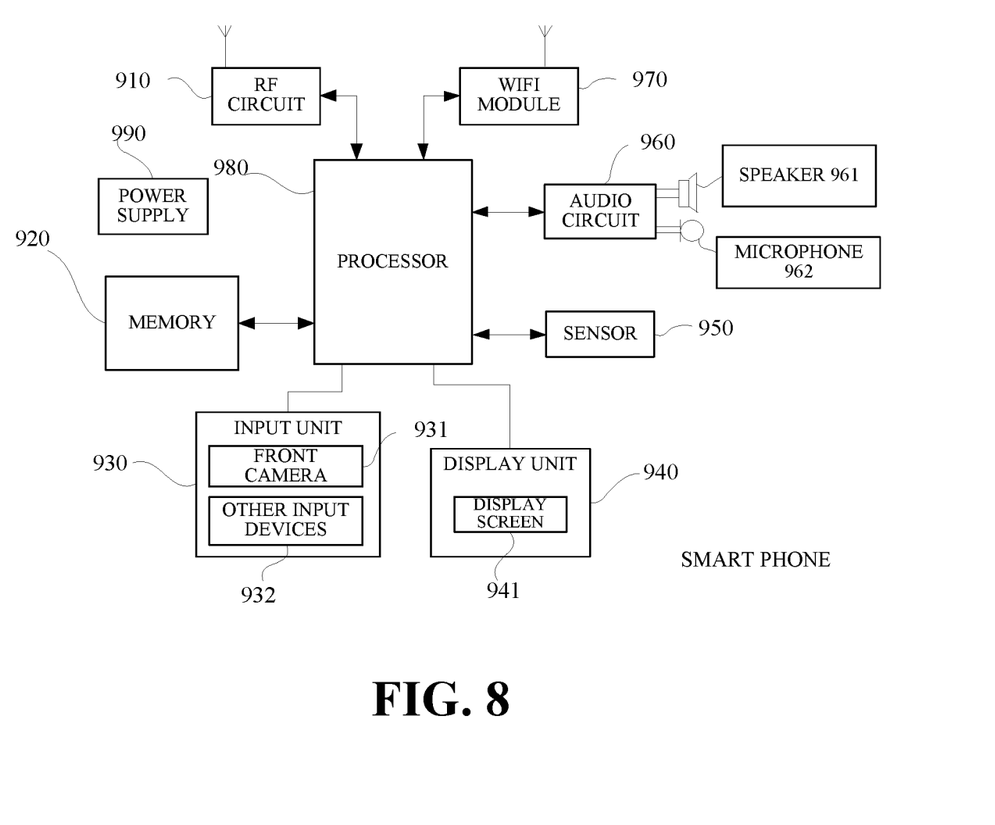
FIG. 8 is a schematic structural diagram of a terminal device according to other implementations.

According to implementations, a terminal device is provided. As illustrated in FIG. 8, for the convenience of description, only parts related to the implementations of the present application are shown. For the parts not described in detail in one implementation, reference may be made to related descriptions in other implementations. The terminal device may be any terminal device such as a mobile phone, a tablet computer, a personal digital assistant (PDA), a point of sales (POS), an in-vehicle computer, and the like. The following describes a mobile phone as an example of the terminal device.

FIG. 8 is a block diagram illustrating a partial structure of a mobile phone related to a terminal device according to implementations. As illustrated in FIG. 8, the mobile phone includes a radio frequency (RF) circuit 910, a memory 920, an input unit 930, a display unit 940, a sensor 950, an audio circuit 960, a wireless fidelity (Wi-Fi) module 970, a processor 980, a power supply 990, and other components. Those skilled in the art can understand that the structure of the mobile phone illustrated in FIG. 8 does not constitute any limitation on a mobile phone. The mobile phone configured to implement technical solutions of the disclosure may include more or fewer components than illustrated, or may combine certain components, or may adopt different arrangements of components.

In the following, various components of the mobile phone will be described in detail with reference to FIG. 8.

The RF circuit 910 is configured to receive or transmit information. Generally, the RF circuit 910 includes but is not limited to an antenna, at least one amplifier, a transceiver, a coupler, a LNA, a duplexer, and the like. In addition, the RF circuit 910 may also communicate with a network or other devices via wireless communication. The wireless communication herein may use any communication standard or protocol, which includes but is not limited to global system of mobile communication (GSM), general packet radio service (GPRS), code division multiple access (CDMA), wideband code division multiple access (WCDMA), long term evolution (LTE), E-mail, short messaging service (SMS), and so on.

The memory 920 is configured to store software programs and modules. The processor 980 is configured to execute various function applications and data processing of the mobile phone by running the software programs and the modules stored in the memory 920. The memory 920 may mainly include a program storage area and a data storage area. The program storage area may store an operating system, applications required for at least one function, and the like. The data storage area may store data created according to the use of the smart phone, and the like. In addition, the memory 920 may include a high-speed RAM, and may further include a non-transitory memory, such as at least one disk storage device, a flash device, or other non-transitory solid-state storage devices.

The input unit 930 is configured to receive input digital or character information and to generate key signal input associated with user setting and function control of the mobile phone. The input unit 930 may include a front camera 931 and other input devices 932. The front camera 931 is configured to collect user's facial information. In addition to the front camera 931, the input unit 930 may further include other input devices 932. The other input devices 932 may include at least one of a physical keyboard, a function key (such as a volume control key, a switch key, etc.), a trackball, a mouse, a joystick, and the like.

The display unit 940 is configured to display information input by a user or information provided for the user or various menus of the mobile phone. The display unit 940 may include a display screen 941. In an example, the display screen 941 may be in the form of a liquid crystal display (LCD), an organic light-emitting diode (OLED), and so on. Although in FIG. 8, the front camera 931 and the display screen 941 are implemented as two separate components to implement the input and output functions of the mobile phone, in some occasions, the front camera 931 and the display screen 941 can be integrated to realize the input and output functions of the mobile phone.

The mobile phone may further include at least one sensor 950, such as a light sensor, a motion sensor, and other sensors. The light sensor may include an ambient light sensor and a proximity sensor. The ambient light sensor may adjust brightness of the display screen 941 according to ambient lights. The proximity sensor may turn off the display screen 941 and/or backlight when the mobile phone reaches near the ear. As a kind of the motion sensor, an accelerometer sensor can detect the magnitude of acceleration in all directions (typically three axes), and when the mobile phone is stationary, the accelerometer sensor can detect the magnitude and direction of gravity; the accelerometer sensor can also be applied to applications for identifying mobile-phone gestures (such as vertical and horizontal screen switching, related games, magnetometer attitude calibration), or the accelerometer sensor can be used for vibration-recognition related functions (such as a pedometer, or a percussion) and so on. The mobile phone can also be equipped with a gyroscope, a barometer, a hygrometer, a thermometer, an infrared sensor, and other sensors, and it will not be repeated herein.

The audio circuit 960, a speaker 961, and a microphone 962 may provide an audio interface between the user and the mobile phone. The audio circuit 960 may convert the received audio data into electrical signals and transfer the electrical signals to the speaker 961; thereafter the speaker 961 converts the electrical signals into sound signals for output. On the other hand, the microphone 962 converts the received sound signals into electrical signals, which will be received and converted into audio data by the audio circuit 960 to be output to the processor 980. The audio data is then processed and transmitted by the processor 980 via the RF circuit 910 to another mobile phone for example, or the audio data is output to the memory 920 for further processing.

Wi-Fi belongs to a short-range wireless transmission technology. With aid of the Wi-Fi module 970, the mobile phone may assist the user in E-mail receiving and sending, webpage browsing, access to streaming media, and the like. Wi-Fi provides users with wireless broadband Internet access. Although the Wi-Fi module 970 is illustrated in FIG. 8, it should be understood that the Wi-Fi module 970 is not essential to the mobile phone and can be omitted according to actual needs without departing from the essential nature of the disclosure.

The processor 980 is a control center of the mobile phone. The processor 980 is configured to connect various parts of the entire smart phone through various interfaces and lines, and to execute various functions of the smart phone and process data by running or executing software programs and/or modules stored in the memory 920 and invoking data stored in the memory 920, thereby monitoring the smart phone as a whole. In at least one example, the processor 980 may include at least one core processing unit. For example, the processor 980 can be integrated with an application processor and a modem processor, where the application processor is mainly configured to handle and maintain an operating system, a user interface, applications, and so on, and the modem processor is mainly configured to process wireless communication. It will be appreciated that the modem processor mentioned above may not be integrated into the processor 980.

The mobile phone also includes a power supply 990 (e.g., a battery) that supplies power to various components. For instance, the power supply 990 may be logically coupled to the processor 980 via a power management system to achieve management of charging, discharging, and power consumption through the power management system.

Although not illustrated, a camera, a Bluetooth module, etc. may further be included in the mobile phone, which will not be elaborated herein.

In any of the foregoing implementations illustrated in FIG. 2 to FIG. 5, each operation or method may be implemented based on the structure of the mobile phone.

In the foregoing implementations illustrated in FIG. 6A and FIG. 6B, the function of each unit can be implemented based on the structure of the mobile phone.

A computer program product is provided. The computer program product includes a non-transitory computer-readable storage medium that stores computer programs. The computer programs are operable with a computer to perform part or all of the operations of any of the methods described in the foregoing method implementations.

A non-transitory computer-readable storage medium is provided. The non-transitory computer-readable storage medium may store computer programs which, when executed, are operable with a computer to: enable a facial information collecting device of a terminal device and generate a switching notification to notify a display screen of the terminal device to display at least one frame of transition interface before displaying a preview interface; display, on the display screen, the at least one frame of transition interface according to the switching notification; collect facial information with the facial information collecting device enabled and display, on the display screen, the preview interface when the facial information collecting device collects facial information.

In addition, the computer programs are operable with the computer to perform all or part of the operations corresponding to the foregoing method implementations.

It is to be noted that, for the sake of simplicity, the foregoing method implementations are described as a series of action combinations, however, it will be appreciated by those skilled in the art that the disclosure is not limited by the sequence of actions described. According to the disclosure, certain steps or operations may be performed in other order or simultaneously. Besides, it will be appreciated by those skilled in the art that the implementations described in the specification are example implementations and the actions and modules involved are not necessarily essential to the disclosure.

In the foregoing implementations, the description of each implementation has its own emphasis. For the parts not described in detail in one implementation, reference may be made to related descriptions in other implementations.

In the implementations of the disclosure, it should be understood that, the device disclosed in implementations provided herein may be implemented in other manners. For example, the device implementations described above are merely illustrative; for instance, the division of the unit is only a logical function division and there can be other manners of division during actual implementations, for example, multiple units or components may be combined or may be integrated into another system, or some features may be ignored or not performed. In addition, coupling or communication connection between each illustrated or discussed component may be direct coupling or communication connection, or may be indirect coupling or communication connection among devices or units via some interfaces, and may be electrical connection, or other forms of connection.

The units described as separate components may or may not be physically separated, the components illustrated as units may or may not be physical units, that is, they may be in the same place or may be distributed to multiple network elements. All or part of the units may be selected according to actual needs to achieve the purpose of the technical solutions of the implementations.

In addition, the functional units in various implementations of the disclosure may be integrated into one processing unit, or each unit may be physically present, or two or more units may be integrated into one unit. The above-mentioned integrated unit can be implemented in the form of hardware or a software function unit.

The integrated unit may be stored in a computer-readable memory when it is implemented in the form of a software functional unit and is sold or used as a separate product. Based on such understanding, the technical solutions of the disclosure essentially, or the part of the technical solutions that contributes to the related art, or all or part of the technical solutions, may be embodied in the form of a software product which is stored in a memory and includes instructions for causing a computer device (which may be a personal computer, a server, or a network device and so on) to perform all or part of the steps described in the various implementations of the present disclosure. The memory includes various medium capable of storing program codes, such as a universal serial bus (USB) flash disk, a read-only memory (ROM), a RAM, a removable hard disk, Disk, compact disc (CD), or the like.

It will be understood by those of ordinary skill in the art that all or a part of the various methods of the implementations described above may be accomplished by means of a program to instruct associated hardware, the program may be stored in a computer-readable memory, which may include a flash memory, a ROM, a RAM, a disk or a CD, and so on.

The foregoing illustrates the implementations of the disclosure in detail. The principle and implementations of the disclosure are illustrated by specific examples. The illustration of the above implementations is merely used to facilitate understanding of the methods and core concept of the disclosure. For a person skilled in the art, according to the concept of the disclosure, specific implementations and application ranges may be both changed. Based on the above, the disclosure shall not be understood to be limited to the specification.

What is claimed is:

1. A terminal device, comprising:
   a camera configured to collect facial information;
   a display screen configured to display a preview interface, in which the facial information currently collected by the camera is presented; and
   a processor coupled with the camera and the display screen and configured to:
      generate a switching notification to notify the display screen to display at least one frame of transition interface before displaying the preview interface, wherein the at least one frame of transition interface comprises a multi frame transition interface;
      control the display screen to switch from the multi frame transition interface to the preview interface, upon detecting that, for the multi frame transition interface, a number of frames that have been played is greater than or equal to a preset number; and
      update the multi frame transition interface according to the facial information collected by the camera, wherein
   the display screen is configured to filter out, according to the switching notification, at least one frame of black-screen interface which is displayed before displaying the preview interface; and
   the processor is configured to invoke a facial enrolling application to display at least one frame of transition interface corresponding to the at least one frame of black-screen interface filtered out.

2. The terminal device of claim 1, wherein the at least one frame of transition interface comprises a single frame transition interface, and the processor is further configured to:
   control the display screen to switch from the single frame transition interface to the preview interface, upon detecting that the single frame transition interface has been played for a duration longer than or equal to a preset duration.

3. The terminal device of claim 1, wherein the processor is further configured to:
   acquire the facial information collected by the camera;
   determine whether the facial information collected by the camera matches a facial information template; and
   unlock the terminal device based on a determination that the facial information collected by the camera matches the facial information template.

4. The terminal device of claim 1, wherein the processor is further configured to receive an instruction, wherein the camera is configured to be enabled in response to the instruction, and the processor is configured to generate the switching notification in response to the instruction.

5. A method for facial information preview for a terminal device, comprising:
  enabling a camera of the terminal device and generating a switching notification to notify a display screen of the terminal device to display at least one frame of transition interface before displaying a preview interface, wherein the at least one frame of transition interface comprises a multi frame transition interface;
  displaying, on the display screen, the at least one frame of transition interface according to the switching notification;
  collecting facial information with the camera enabled and displaying, on the display screen, the preview interface when the camera collects facial information;
  switching from the multi frame transition interface to the preview interface, upon detecting that, for the multi frame transition interface, a number of frames that have been played is greater than or equal to a preset number; and
  updating the multi frame transition interface according to the facial information collected by the camera, wherein
  displaying, on the display screen, the at least one frame of transition interface according to the switching notification comprises:
  filtering out at least one frame of black-screen interface which is displayed before displaying the preview interface; and
  invoking a facial enrolling application to display at least one frame of transition interface corresponding to the at least one frame of black-screen interface filtered out.

6. The method of claim 5, wherein the at least one frame of transition interface comprises a single frame transition interface, and the method further comprises:
  prior to collecting the facial information and displaying, on the display screen, the preview interface,
    switching from the single frame transition interface to the preview interface, upon detecting that the single frame transition interface has been played for a duration longer than or equal to a preset duration.

7. The method of claim 5, further comprising:
  acquiring the facial information collected by the camera;
  determining whether the facial information collected by the camera matches a facial information template; and
  unlocking the terminal device based on a determination that the facial information collected by the camera matches the facial information template.

8. The method of claim 5, further comprising:
  prior to enabling the camera and generating the switching notification,
  receiving an instruction.

9. A non-transitory computer-readable storage medium configured to store computer programs, the computer programs being operable with a computer to:
  enable a camera of a terminal device and generate a switching notification to notify a display screen of the terminal device to display at least one frame of transition interface before displaying a preview interface, wherein the at least one frame of transition interface comprises a multi frame transition interface;
  display, on the display screen, the at least one frame of transition interface according to the switching notification;
  collect facial information with the camera enabled and display, on the display screen, the preview interface when the camera collects facial information;
  switch from the multi frame transition interface to the preview interface, upon detecting that, for the multi frame transition interface, a number of frames that have been played is greater than or equal to a preset number; and
  update the multi frame transition interface according to the facial information collected by the camera, wherein
  the computer programs operable with the computer to display, on the display screen, the at least one frame of transition interface according to the switching notification are operable with the computer to:
  filter out at least one frame of black-screen interface which is displayed before displaying the preview interface; and
  invoke a facial enrolling application to display at least one frame of transition interface corresponding to the at least one frame of black-screen interface filtered out.

10. The non-transitory computer-readable storage medium of claim 9, wherein the at least one frame of transition interface comprises a single frame transition interface, wherein the computer programs are further operable with the computer to:
  prior to collecting the facial information and displaying, on the display screen, the preview interface,
    switch from the single frame transition interface to the preview interface, upon detecting that the single frame transition interface has been played for a duration longer than or equal to a preset duration.

* * * * *